United States Patent
Dernoga

Patent Number: 6,026,739
Date of Patent: Feb. 22, 2000

[54] BAKING DEVICE

[76] Inventor: Margarette Dernoga, 455 Flannergy, Fergus, Ontario, Canada, N1M 3P3

[21] Appl. No.: 09/033,854

[22] Filed: Mar. 3, 1998

[30] Foreign Application Priority Data

Mar. 3, 1997 [CA] Canada .................................. 2198962

[51] Int. Cl.[7] ................................ A47J 37/01; A21B 5/00
[52] U.S. Cl. ............................................. 99/433; 645/447
[58] Field of Search ................... 99/433, 645, DIG. 15, 99/447

[56] References Cited

U.S. PATENT DOCUMENTS

| | | | |
|---|---|---|---|
| 1,180,782 | 4/1916 | McLaughlin | 99/433 |
| 1,827,062 | 10/1931 | Austin | 99/433 |
| 3,951,053 | 4/1976 | Kirkpatrick | 99/433 |
| 4,080,884 | 3/1978 | Terrell | 99/433 |
| 5,823,098 | 10/1998 | Perry | 99/433 |

*Primary Examiner*—Reginald L. Alexander
*Attorney, Agent, or Firm*—Fitzpatrick, Cella, Harper & Scinto

[57] ABSTRACT

A device to prevent over-browning of the rim of a pie crust during baking comprise a flat ring of heat deflecting material to overlie the rim portion of the pie crust and a depending flange at its outer edge to position the device.

7 Claims, 2 Drawing Sheets

BAKING DEVICE

BACKGROUND OF THE INVENTION

This baking invention is concerned with a device to prevent over browning of pie crusts during baking.

When baking pies of the double crust, single top crust or single bottom crust there is a problem in that the rims or edges of the crusts cook faster than the remainder of the crust. This is because the pie filing slows down the cooking of the remainder of the crust. The result is that the edges of the crust become over brown and tough or that the centre parts of the crusts are under-cooked.

To avoid this problem, cooks have tried to protect the rims of the crusts. To do this, they have taken strips of aluminum foil and joined them end to end by folding to form a ring and then pressed the aluminum around the edges of the crust. An alternative method is to take a square of aluminum foil, fold it into quarters, cut a quarter circle from the folded foil and open it up. The foil is then pressed around the edges of the pie crust and at an appropriate time during the baking process or even after baking is completed, is removed. Done with care, these techniques will work but they are time consuming and inexact. Often the foil will become separated from the pie and hence not be effective. When baking an open top pie, the foil may come in contact with the filling and stick to it so that when it is removed, it mars the surface of the filling. This problem has been around for hundreds of years and cries out for a simple solution. The present invention seeks to provide a solution.

SUMMARY OF THE INVENTION

According to one aspect of the present invention, there is provided a device for protecting the edges of a pie crust during baking which comprises a ring of heat deflecting material sized to cover the edges of a pie crust and means on the outer edges of the ring to limit movement of the ring relative to a pie pan with which it is used.

Preferably the means to limit movement of the ring comprise an integrally formed flange. The flange is preferably continuous so that the device has an inverted L-shaped section.

In one aspect of the invention there is pounded a set of the devices each one being sized for a standard size of pie pan.

Preferably, the device is formed of rigid aluminum of a form similar to the common aluminum pie pans available in North American supermarkets. However, it should be recognized that any suitable non-toxic heat resistant materials could be used. For example, the device could be formed of stainless steel.

BRIEF DESCRIPTION OF THE DRAWINGS

Preferred embodiments of the invention are illustrated in the accompanying drawings in which.

DETAILED DESCRIPTION OF THE PRESENTLY PREFERRED EMBODIMENTS

Figure 1:
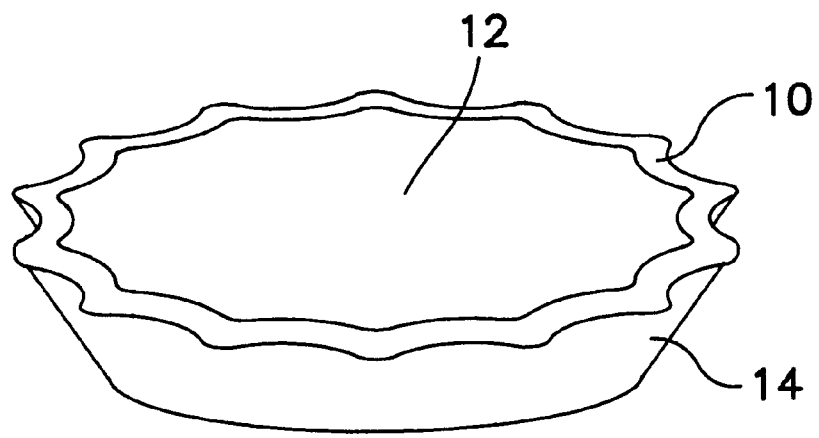
FIG. 1 illustrates a pie prepared for baking.

In FIG. 1 there is shown a pie ready for baking. It comprises a bottom crust 10 with a filling 12 set in a pan 14. If baked without protection, the edges of the crust would cook more quickly than the parts of the crusts covered by the filling and would become over-browned and tough.

Figure 2:
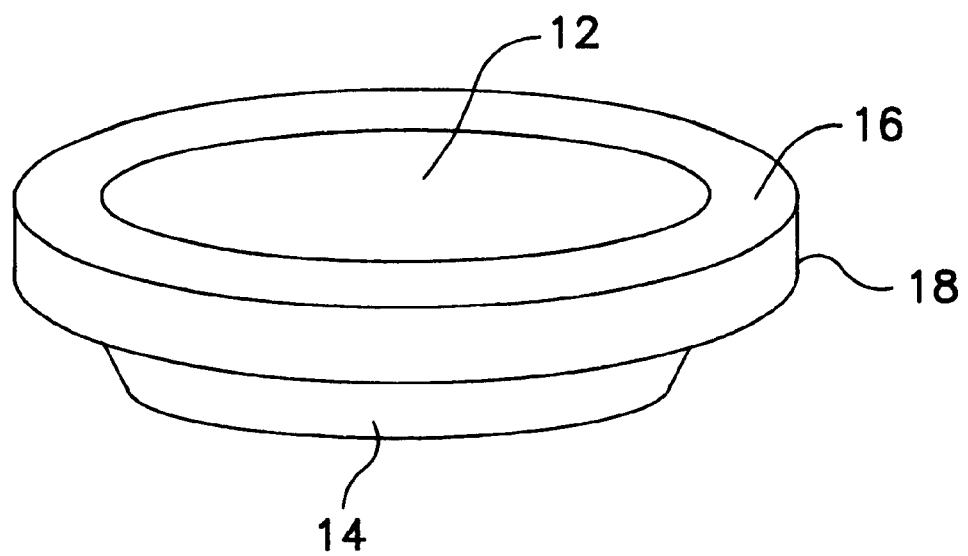
FIG. 2 shows the pie with the device of this invention.

The device of this invention is illustrated in FIG. 2. It comprises a flat ring 16, the outer diameter of which is a little larger than the outer diameter of the pan. The ring has a width of about three or four centimeters so that it overlies edges of the crust of the pie but does not contact the pie filling. A continuous integrally formed flange 18 extends around the outer edge of the ring so that the cross section of the ring resemble an an inverted "L". The flange serves to limit movement of the ring on the pie crust so that there is no risk that it can be displaced to expose the edges of the pie crust to over-cooking.

Figure 3:
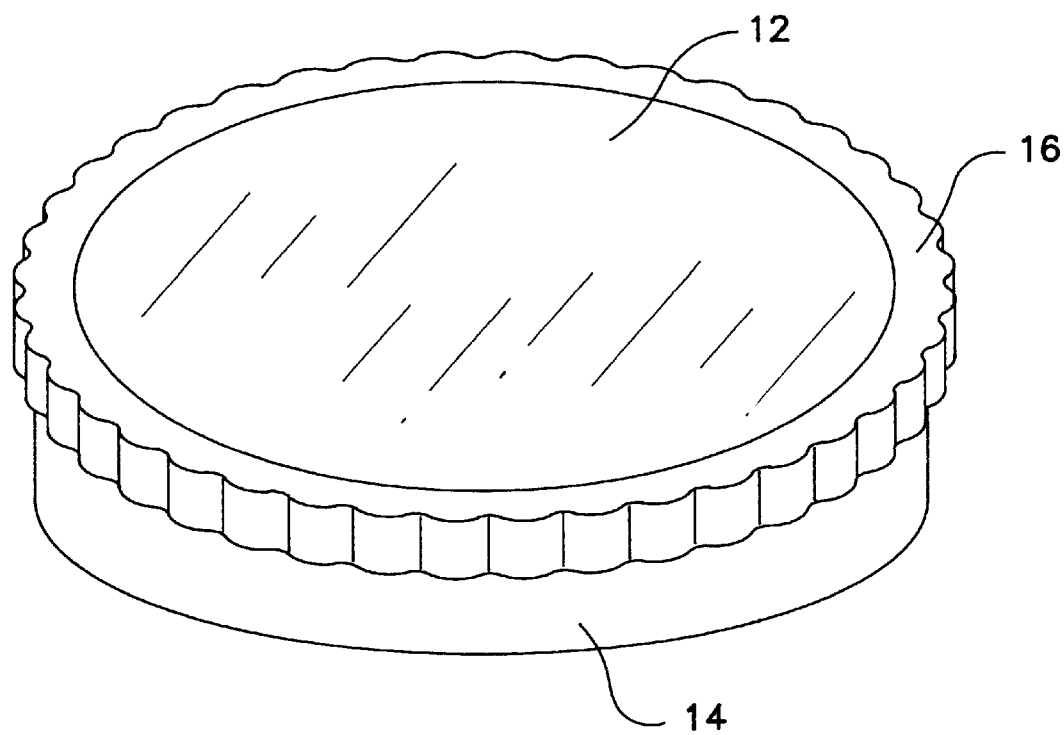
FIG. 3 is an alternative form of the device of this invention.

The embodiment of FIG. 3 is substantially similar to that of FIG. 2 except that it is an annular flange which is fluted.

The device is made from semi-rigid aluminum sheet of the kind used in the production of aluminum baking pans which are sold in supermarkets across North America. This has been found to produce excellent results. It also will make production very simple on exiting equipment for forming those pans with only minor modification.

It will be appreciated that the device can be made from any non-toxic heat resistant material. For example, it could be made from stainless steel. The devices would be sized to fit all common pie pan sizes i.e. 9", 10" and 10½" and preferably sold as sets.

The invention is illustrated in use for baking a bottom crust pie but clearly it is equally effective with double crust pies or single top crust pies. In use, the pie is assembled in the usual manner and when ready for the oven, the device is placed in position over the edges of the pie crust. At an appropriate stage during baking, the oven is opened and the device removed so that the edges of the crust are permitted to become browned.

We claim:

1. A device for protecting the edges of a pie crust during baking consists of:

a one-piece ring of heat deflecting material sized to cover the edges of the pie crust, said ring being substantially flat, continuous, and of uniform thickness; and an annular member on the outer edges of the ring to limit movement of the ring relative to a pie pan with which it is used, said annular member extending downward from said ring and being continuous and of substantially uniform thickness.

2. A device as claimed in claim 1 wherein said annular member comprises an integrally formed flat flange.

3. A device as claimed in claim 1 wherein said annular member is fluted.

4. A device as claimed in any of claims 1, 2 or 3 wherein said ring is formed of aluminum.

5. A device as claimed in any of claims, 1, 2 or 3 wherein said ring is formed from semi-rigid aluminum foil.

6. A device as claimed in any of claims 2 or 3 wherein the ring is three to four centimetres wide.

7. A set of devices for protecting the edges of a pie crust during baking comprises a plurality of rings of heat deflecting material, the rings having different diameters each ring having an outside diameter slightly greater than the diameter of a standard sized baking pan with which it is intended to be used and each having means at its outside diameter to limit movement relative to the pan with which it is to be used.

* * * * *